June 12, 1934.    A. ETIENNE ET AL    1,962,301
PROCESS FOR CARRYING OUT EXOTHERMIC CATALYTIC CHEMICAL REACTIONS
Filed April 26, 1928
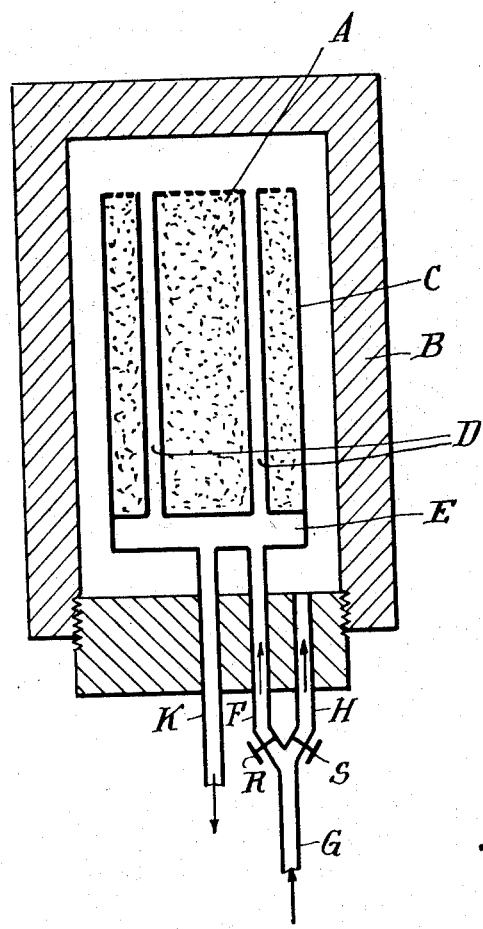
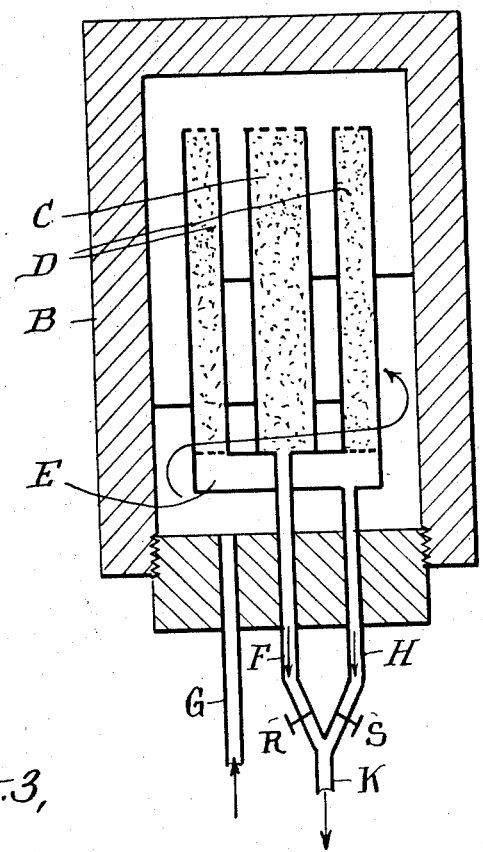
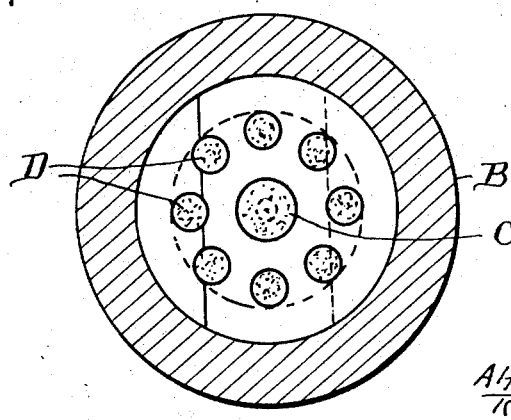
Alfred Etienne and
Roger du Chaffaut
INVENTORS
BY
ATTORNEYS Patented June 12, 1934

1,962,301

UNITED STATES PATENT OFFICE 1,962,301

PROCESS FOR CARRYING OUT EXOTHERMIC CATALYTIC CHEMICAL REACTIONS

Alfred Etienne, Montereau, and Roger du Chaffaut, Varenne-sur-Seine, France, assignors, by mesne assignments, to E. I. du Pont de Nemours & Company, Wilmington, Del., a corporation of Delaware Application April 26, 1928, Serial No. 272,907
In France April 30, 1927

12 Claims. (Cl. 23—289)

This invention relates to processes for carrying out exothermic catalytic chemical reactions and in particular to processes wherein the gases prior to reaction circulate in indirect contact with the catalyzing material during which they become progressively heated whilst any additional heat they may require is supplied from an external source.

It is known that in processes of this type, in order to obtain normal working, the surfaces through which the exchange of heat takes place should be adapted to the quantity of heat evolved in the tube containing the catalyzing material per unit of time, and once the correct adjustment in this respect has been made for definite working conditions, these conditions can only be varied to a slight degree limited by the variations which may be obtained by varying the amount of heating from an external source or the temperature of the gases which are circulated in indirect contact with the catalyzing material.

It has been recognized that under industrial conditions it was necessary to obtain a greater latitude in the operation of the catalysis tubes, and the present invention has for its object to provide a means which will permit of ensuring at all times the normal working of catalysis tubes in which there may occur important variations in the quantity of heat evolved by the reaction per unit of time, such variations taking place during the working and arising from variations in the concentration of certain reacting substances in the gases subjected to the process, variations in the quantity of the gases treated, variations in pressure etc.

Such means is afforded according to the present invention by providing the receptacle or tube containing the catalyzing material with two or more distinct surfaces or groups of surfaces for the transmission of heat, circulating the gases which are to react over the surfaces or groups of surfaces, and effecting during the working a variation in the transmission of heat through the said surfaces or groups of surfaces by varying the quantities of gases which respectively circulate, either before they react or during the time they react, over the different surfaces or groups of surfaces.

Whilst the total superficial area of the whole of the surfaces or groups of surfaces and their heat conductivity will be determined by the necessity of effecting a sufficiently efficacious exchange of heat, the relative importance of these different surfaces or groups of surfaces and of these different heat conductivities will be conditioned by the extent of the zone of regulation that it is desired to obtain.

In order that the said invention may be clearly understood and readily carried into effect, the same will now be more fully described with reference to the accompanying drawing in which:—

Figures 1 and 2 illustrate diagrammatically by way of example two constructions of apparatus for carrying out the present invention, and Figure 3 is a plan view of the receptacle containing the catalyzing material shown in Figure 2.

In the apparatus shown in Figure 1 the receptacle or tube A containing the catalyzing material is arranged as usual within a receptacle B, which if necessary is made pressure-resisting; the tube A comprises an outer surface C as well as an inner nest of tubes D. The surfaces C and of the nest of tubes D may be partially heat insulated. The gases which are to react, which may if necessary be previously heated, enter the apparatus through the pipe G and can be separated into two parts, the one of which passes through the pipe H provided with the regulating valve S and enters the interior of the receptacle B and circulates round the surface C, whilst the other passes through the pipe F provided with the regulating valve R and enters a chamber E which distributes it into the nest of tubes D. These two gaseous streams again mix at the top of the receptacle B and then pass over the catalyzing material where the reaction takes place, finally leaving the apparatus through the pipe K. By way of example there may be considered as a particular case for the application of the apparatus shown in Figure 1 that of a variation in the amount of the gaseous substances which are to react. If the quantity of the gases treated is low, the valve R is closed and there is only utilized the exterior surface C of the tube A containing the catalyzing material. If the quantity of the gases treated increases, then the valve R is opened and the distribution of the gases passing through the valves R and S is regulated in such manner that the two streams of gas, after having circulated respectively around the surface C and through the nest of tubes D and then become mixed, are at a temperature suitable for the reaction.

In the apparatus shown in Figures 2 and 3 the catalyzing material is disposed in a central tube C the surface of which may be partially heat insulated and in a nest of tubes D exterior to said central tube. The central tube C is connected with a gas outlet pipe F provided with a valve R and the nest of tubes D is connected through an intervening chamber E with an outlet pipe H provided with a valve S. The pipes F and H are finally connected by one common outlet pipe K. The gases which are to react enter the apparatus through the pipe G and by means of baffle plates suitably arranged are made to circulate simultaneously in contact with the surface of the nest of tubes D and the surface of the central tube C. Having reached the end of their course the gases divide into two parts regulated by means of the valves R and S, the one passing over the catalyzing material in the tube C, and the other over the catalyzing material contained in the tubes of the nest D. After reaction the gases leave the apparatus through the pipes H and F and become reunited in the pipe K. By way of example there may be considered as a particular case for the application of the apparatus shown in Figure 2 that of a variation of the concentration of certain reacting substances in the gases which may occur in the conversion into methane of carbon monoxide present in the gaseous mixture N+3F, it being assumed that the surface of the nest of tubes D permits, owing to a larger surface, area or a higher heat conductivity or to the simultaneous effect of both these factors, of an exchange of heat notably greater than that afforded by the surface of the central tube C. If the concentration of carbon monoxide is high, say 2 to 3 per cent for example, then the valve S will be closed and the valve R will be opened: if, on the contrary, it is low, of the order of one thousandth for example, then the valve R will be closed and the valve S will be opened. For intermediate concentrations the valves R and S will be regulated in a suitable manner.

Instead of the single central tube C mentioned above, there may also be employed a group of tubes connected to the same outlet pipe F.

It will of course be understood that the process according to the present invention may be employed with a regulable externally or internally arranged electric heating arrangement, and that means may also be provided for varying the temperature at which the gases reach the apparatus; the object of such arrangements will of course be to still further increase the extent of the zone of regulation afforded by the process forming the subject of the present invention. For example if it be assumed that in the case of the apparatus shown in Figure 1 these heat exchanges take place more actively at the contact with the walls of the nest of tubes D than at the contact with the outer wall C, whilst in the case of the apparatus shown in Figure 2, as has been assumed in the example given above, the heat exchanges are effected more actively at the wall q of the nest of tubes D than at those of the central tube C, the temperature of the gases in the pipe F in the case of the apparatus shown in Figure 1 and that of the gases in the pipe G in the case of the apparatus shown in Figure 2, can be altered by a partial exchange of heat with the gases which leave the apparatus through the pipes K and H respectively.

Having now particularly described and ascertained the nature of our said invention and in what manner the same is to be performed, we declare that what we claim is:—

1. The process of effecting an exothermic catalytic gaseous reaction which comprises passing two independent portions of the gases to react in direct heat exchange relation to but not in actual contact with the catalyst, thereafter combining the two portions of the gases and conducting the same into actual contact with the catalyst, while controlling the reactions by regulating the relative size of said portions of the gases to react.

2. The process of effecting an exothermic catalytic gaseous reaction which comprises passing a portion of the stream of gases to react around and in heat exchange relation to but not in direct contact with a body of catalyst and simultaneously passing a second portion of said gaseous stream through and in heat exchange relation to but not in actual contact with said catalyst, and thereafter combining said portions of the gaseous stream and directing the same into actual contact with the catalyst.

3. The process of effecting an exothermic catalytic gaseous reaction which comprises passing a portion of the stream of gases to react around and in heat exchange relation to but not in direct contact with a body of catalyst and simultaneously passing a second portion of said gaseous stream through and in heat exchange relation to but not in actual contact with said catalyst, and thereafter combining said portions of the gaseous stream and directing the same into actual contact with the catalyst, while controlling the reaction by regulating the relative size of said portions of the gaseous stream.

4. The process of effecting an exothermic catalytic gaseous reaction which comprises passing a stream of gases to react in heat exchange relation to but not in actual contact with the catalyst, and thereafter passing separate portions of said stream independently into contact with said catalyst, while controlling the reaction by regulating the relative size of said portions of the gaseous stream.

5. The process of effecting an exothermic catalytic gaseous reaction which comprises passing a stream of gases to react around and in heat exchange relation to but not in actual contact with the catalyst, and thereafter passing separate portions of said stream independently into contact with said catalyst, while controlling the reaction by regulating the relative size of said portions of the gaseous stream.

6. The process of effecting an exothermic catalytic gaseous reaction which comprises circulating the gases to react in one current along the surface of two sets of tubes containing the catalyst, admitting the current of gases to the catalyst, while passing one portion of the gases through one set of tubes, and simultaneously passing the other portion of the gases through the other set of tubes, and finally evacuating the gases from the tubes while controlling the relative flow of gases from each set of tubes.

7. The process of effecting an exothermic catalytic gaseous reaction which comprises circulating the gases to react in one current along the surface of two sets of tubes containing the catalyst, admitting the current of gases to the catalyst, while passing one portion of the gases through one set of tubes, and simultaneously passing the other portion of the gases through the other set of tubes, and finally evacuating each portion of the gases by a different outlet for each set of tubes, while controlling the relative size of said portions of the gases by separately regulating the rate of withdrawal thereof from each set of catalyst containing tubes.

8. In an apparatus for effecting catalytic exothermic gaseous reactions comprising the combination of an outer shell enclosing a plurality of catalyst receptacles spaced therefrom and containing separate bodies of catalyst, said receptacles communicating at one end thereof with a space between the same and the shell and at the other end with one or more gas outlets, the space between the shell and the catalyst receptacles being in communication at the same end with a gas inlet, with means to regulate the relative flow of gases from different catalyst receptacles or different groups thereof.

9. A catalytic reaction apparatus including a plurality of separate bodies of catalyst therein, means to convey a stream of gases in heat exchange relation with said bodies of catalyst before delivery to actual contact therewith, and means to regulate separately the relative rates of flow of gases from said catalyst bodies whereby the reaction temperature may be controlled.

10. Process of effecting an exothermic catalytic gaseous reaction, which comprises circulating a single stream of gases to react around and in heat exchange relation to separated bodies of catalyst, delivering separate portions of said stream to the catalyst bodies, and controlling the reaction by regulating the relative rates of withdrawal of said streams of gases from said catalyst bodies.

11. The process of effecting an exothermic catalytic gaseous reaction which comprises circulating the gases to react in one current along the surface of parallelly disposed bodies of the catalyst having different cross-sections, admitting said gases to said bodies of catalyst, and separately uniting in one current the gases which have passed through at least one body of the catalyst of relatively large cross-section, and in another current the gases which have passed through at least one other body of the catalyst of relatively small cross-section, while separately controlling the rates of flow of the different currents of gases thus formed.

12. A catalytic reaction apparatus including therein bodies of catalyst spaced from one another and contained within tubes of different heat conductivities, means to convey a stream of gases in heat exchange relation with said bodies of catalyst before delivery to actual contact therewith, and means to regulate separately the relative rates of flow of gases from said catalyst bodies whereby the reaction temperature may be controlled.

ALFRED ETIENNE.
ROGER DU CHAFFAUT.